United States Patent
Pearen et al.

(10) Patent No.: US 10,855,040 B2
(45) Date of Patent: Dec. 1, 2020

(54) FLEXIBLE ELECTRICAL CONNECTORS FOR ELECTROLYTIC CELLS

(71) Applicant: HATCH LTD., Mississauga (CA)

(72) Inventors: Dale Mackenzie Pearen, Milton (CA); Maciej Jastrzebski, Mississauga (CA); Bijan Shahriari, Toronto (CA)

(73) Assignee: Hatch Ltd., Mississauga (CA)

( * ) Notice: Subject to any disclaimer, the term of this patent is extended or adjusted under 35 U.S.C. 154(b) by 0 days.

(21) Appl. No.: 16/321,740

(22) PCT Filed: Jul. 28, 2017

(86) PCT No.: PCT/CA2017/050910
§ 371 (c)(1),
(2) Date: Jan. 29, 2019

(87) PCT Pub. No.: WO2018/018158
PCT Pub. Date: Feb. 1, 2018

(65) Prior Publication Data
US 2019/0165529 A1    May 30, 2019

Related U.S. Application Data

(60) Provisional application No. 62/368,229, filed on Jul. 29, 2016.

(51) Int. Cl.
*H01R 35/02*  (2006.01)
*C25C 3/16*  (2006.01)
(Continued)

(52) U.S. Cl.
CPC ............... *H01R 35/02* (2013.01); *C25C 3/16* (2013.01); *H01M 8/0202* (2013.01); *H01R 4/34* (2013.01); *H02G 11/00* (2013.01)

(58) Field of Classification Search
CPC .......... H01R 35/02; H01R 4/34; H02G 11/00; H01M 8/0202; C25C 3/16
See application file for complete search history.

(56) References Cited

U.S. PATENT DOCUMENTS 3,161,579 A * 12/1964 Henry ................. C25C 3/08
                                                                  204/247.3
3,375,185 A *  3/1968 Kibby .................. C25C 3/125
                                                                    204/280
(Continued)

FOREIGN PATENT DOCUMENTS

CN      101374979      2/2009
WO      2015051213     11/2015

OTHER PUBLICATIONS

European Search Report; EP 17833159.1 dated May 13, 2020.
(Continued)

*Primary Examiner* — Truc T Nguyen
(74) *Attorney, Agent, or Firm* — Ridout and Maybee LLP

(57) ABSTRACT

A flexible electrical connector assembly is adapted to connect a bus bar of an electrolytic cell to a collector bar of the electrolytic cell. The assembly includes an electrical connector including a plurality of conductive metal sheets, the electrical connector having a collector bar end and a bus bar end. The electrical connector may be adapted for being joined, at the collector bar end, to the collector bar and, at the bus bar end, to the bus bar. The electrical connector may be adapted to implement a change in direction, at a bend along a current-carrying path between the bus bar end and the collector bar end, the bend assisting to define the change in direction as greater than 90 degrees.

18 Claims, 18 Drawing Sheets

(51) Int. Cl.
*H02G 11/00* (2006.01)
*H01R 4/34* (2006.01)
*H01M 8/0202* (2016.01)

(56) References Cited

U.S. PATENT DOCUMENTS

| | | |
|---|---|---|
| 3,404,081 A | 10/1968 | Cummings |
| 3,432,422 A | 3/1969 | Currey |
| 3,579,432 A | 5/1971 | Finnegan |
| 3,650,941 A | 3/1972 | Finnegan |
| 3,783,122 A | 1/1974 | Inoy et al. |
| 3,821,101 A | 6/1974 | Nikiforov et al. |
| 3,907,391 A | 9/1975 | Emery et al. |
| 4,105,529 A | 8/1978 | Pohto |
| 4,359,377 A | 11/1982 | Blanc |
| 4,394,242 A * | 7/1983 | Clark ............ C25C 3/16 204/243.1 |
| 6,410,875 B2 * | 6/2002 | Allard ............ H01H 1/5822 218/118 |
| 7,098,418 B1 * | 8/2006 | Yamada ............ H01H 1/0015 218/120 |
| 8,115,124 B2 * | 2/2012 | Maruyama ............ H01H 1/5822 200/50.27 |
| 9,570,826 B2 * | 2/2017 | Chen ............ H01R 13/02 |
| 2009/0218319 A1 * | 9/2009 | Kagawa ............ H01H 1/5822 218/140 |
| 2016/0186344 A1 * | 6/2016 | Renaudier ............ C25C 3/16 204/225 |

OTHER PUBLICATIONS

Office Action; CN Application No. 201780060127.4 dated Feb. 3, 2020.
Partial Supplementary European Search Report; EP 17833159.1 dated Mar. 4, 2020.

* cited by examiner

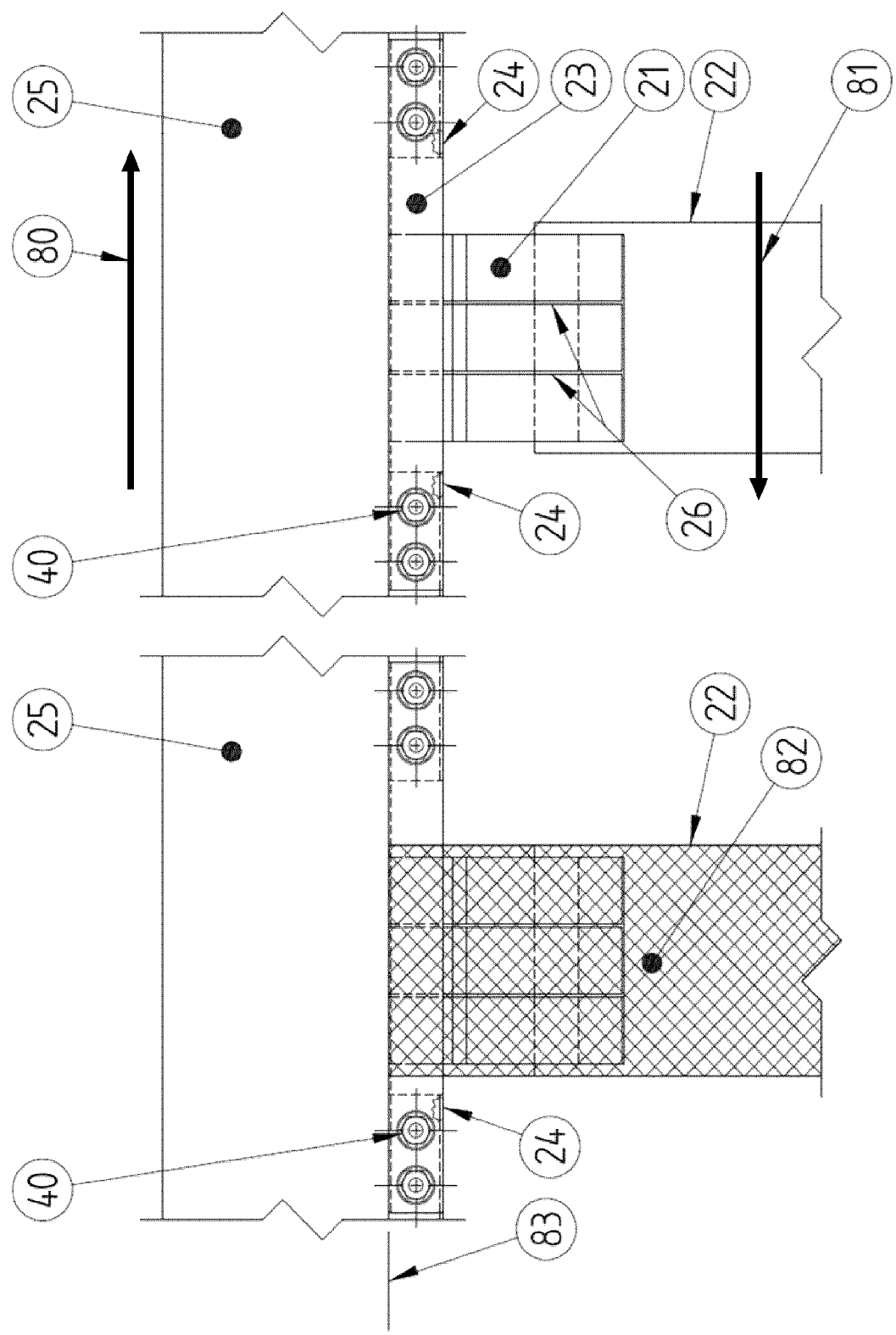

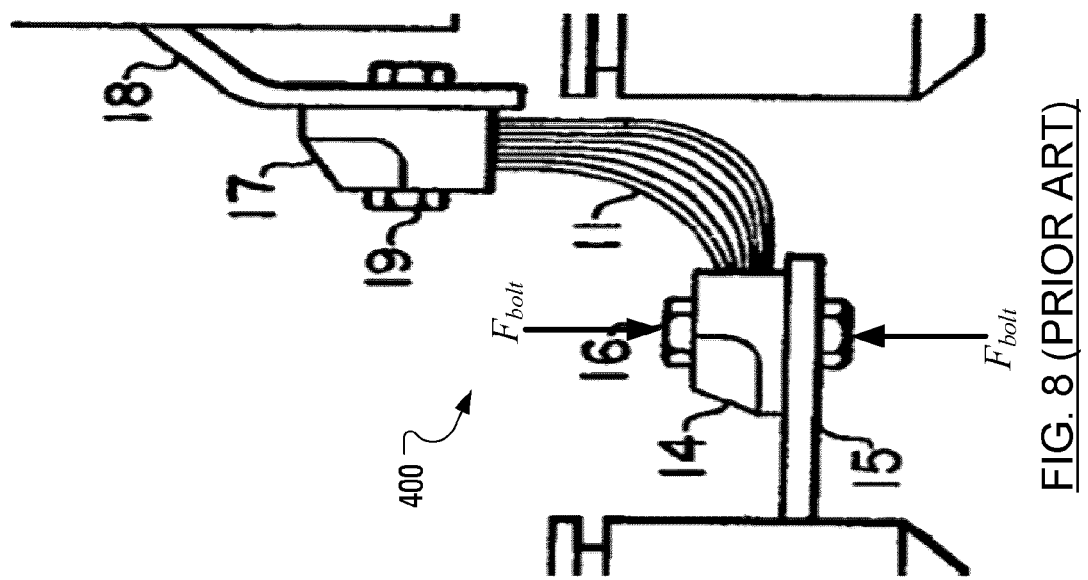

FLEXIBLE ELECTRICAL CONNECTORS FOR ELECTROLYTIC CELLS

FIELD

The present application relates, generally, to electrical connectors for electrolytic cells and, more particularly, to flexible electrical connectors for such electrolytic cells.

BACKGROUND

Aluminum is produced using the electrolytic Hall-Héroult process. Conventional plants utilize hundreds of cells (or pots) connected in series and housed in a long building (or potline), together with transformers, rectifiers, bus bars, feed systems, cranes, tapping equipment and other ancillaries.

An aluminum cell comprises anodes suspended above a bath of electrolyte overlying a pad of molten aluminum, which acts as the cathode on which metallic aluminum collects. Typically, the anodes are carbon blocks suspended on a moveable beam (or beams) within a superstructure placed above the bath of electrolyte. The bath and aluminum pad are contained in a refractory lining which includes a carbon-based bottom composed of cathode blocks (furnished with current collector bars), refractory wall blocks and other elements. The lining itself is housed in a steel tank, termed a potshell. The lining's wall blocks are designed to be cooled by intimate thermal contact with the inside surface of the potshell, which is itself cooled externally by natural or forced convection means.

The Hall-Héroult process is an electrolytic process. The production of aluminum in an aluminum cell is approximately proportional to the current supplied to the cell. It is generally accepted that modern aluminum cells are limited to operating at electrode current densities of approximately 1 $A/cm^2$. As a result, the productivity of an aluminum cell depends on the area of the electrodes, which can be characterized as the area of the cathodes or anodes in the horizontal plane.

The available electrode area for a cell is constrained by the internal dimensions of the potshell and the lining design. The internal dimensions of the potshell are constrained by the size of the potshell structure, the cell-to-cell spacing, and the dimensions of surrounding equipment, for example bus bars, support plinths etc.

SUMMARY

Aspects of the present application relate to a flexible electrical connector that allows for an increase in the reaction area for a given electrolytic cell footprint. Conveniently, such an increase may be considered to increase a production capacity and/or lower capital costs per tonne of production capacity of an aluminum Hall-Héroult cell potline.

According to an aspect of the present disclosure, there is provided a flexible electrical connector assembly is adapted to connect a bus bar of an electrolytic cell to a collector bar of the electrolytic cell. The assembly includes an electrical connector including a plurality of conductive metal sheets, the electrical connector having a collector bar end and a bus bar end. The electrical connector may be adapted for being joined, at the collector bar end, to the collector bar and, at the bus bar end, to the bus bar. The electrical connector may be adapted to implement a change in direction, at a bend along a current-carrying path between the bus bar end and the collector bar end, the bend assisting to define the change in direction as greater than 90 degrees.

According to another aspect of the present disclosure, there is provided a flexible electrical connector assembly suitable for connecting a bus bar of an electrolytic cell to a collector bar of the electrolytic cell. The assembly includes a flexible element, a means of connecting the flexible element to the bus bar, either directly; or through an intermediate element, whereby, when viewed vertically from above, the connection, made via the means of connecting the flexible element to the bus bar, is substantially made at least 5 mm outside of both: i) the limits of the collector bar; and (ii) the extension of the limits of the collector bars if those limits extended out to the fundamental plane defining the inner bus bar surface facing the electrolytic cell.

It will be apparent to those skilled in the art that aspects of the present application may be applied in situations involving high-amperage electrical connections between two or more pieces of equipment, where relative movement between the equipment is to be accommodated and where a gap between the equipment within which the electrical connection exists is to be minimized.

BRIEF DESCRIPTION OF THE DRAWINGS

In order that the claimed subject matter may be more fully understood, references will be made, by way of example, to the accompanying drawings, in which:

FIG. 7A illustrates, in a plan view, certain relevant features and a region of the flexible electrical connector arrangement of FIG. 5;

FIG. 7B illustrates, in a plan view, a representation of relative movements of the collector bars and bus bars in the longitudinal direction of the cell as shown on the flexible electrical connector arrangement of FIG. 5;

FIG. 8 illustrates, in a side elevation view, connection detail including clamping force vectors for a known flexible electrical connector;

DETAILED DESCRIPTION OF EMBODIMENTS

In the following description, specific details are set out to provide examples of the claimed subject matter. However, the embodiments described below are not intended to define or limit the claimed subject matter. It will be apparent to those skilled in the art that many variations of the specific embodiments may be possible within the scope of the claimed subject matter.

Figure 1A:
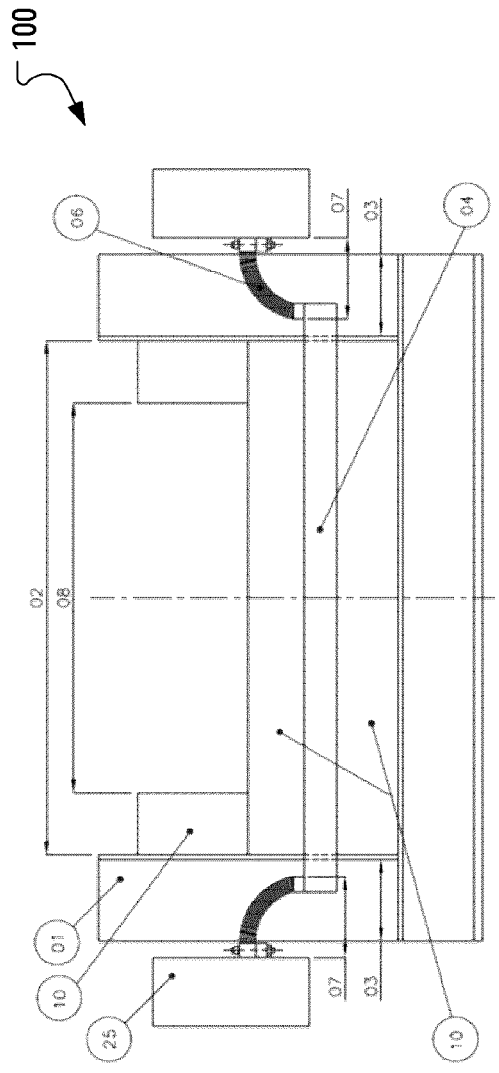
FIG. 1A illustrates, in sectional view, a simplified, representative portion of a known aluminum cell with current collector bars, bus bars, sidewall support structure and flexible electrical connectors.
Figure 1B:
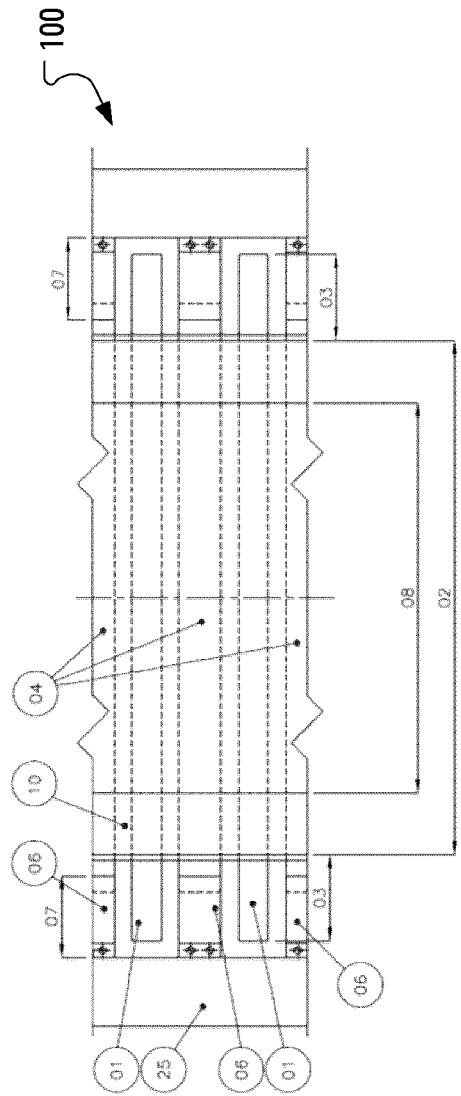
FIG. 1B illustrates, in plan view, the portion of the aluminum cell illustrated in FIG. 1A.

FIGS. 1A and 1B illustrate a simplified, representative portion of a conventional aluminum cell 100 showing a current collector bar (04), bus bars (one of which is associated, in FIG. 1A, with reference numeral 25), sidewall support structure (one of which is associated, in FIG. 1A, with reference numeral 01) and flexible electrical connectors (one of which is associated, in FIG. 1A, with reference numeral 06). Many items are not shown in FIGS. 1A and 1B. Among those items not shown in FIGS. 1A and 1B are a metal pad, an alumina solution (e.g., cryolite), anodes and a superstructure. The aluminum cell 100 of FIG. 1A has an internal area (02) available to the lining (10) and anodes.

Modern aluminum cells, such as the aluminum cell 100 illustrated in FIG. 1A, incorporate potshells with sidewalls and sidewall support structures (also known as cradles) to resist growth during operation. Such growth may be due to chemical swelling and thermal expansion. One way that the internal area (02) available to the lining (10) and electrodes (anodes not shown) can be maximized is by optimizing the depth measurement (03) of the sidewall support structure (01). That is, to arrange the sidewall support structure (01) to be as thin as possible. As the internal area (02) available to the lining (10) and electrodes is maximized, an internal production area (08) available to the electrodes can also be maximized, depending on the required width of sidewall lining. A published patent application, PCT/CA2015/051213, describes a method to reduce the sidewall support structure depth significantly.

As the depth of the sidewall support structure is reduced, a distance between the current collector bars (04), which draw current from the cathode blocks of one cell, and the bus bars (25), which provide current to the anode of a subsequent cell, can be reduced, as can the distance between the potshell wall and the bus bars (25). The collector bars (04) and bus bars (25) are joined via flexible electrical connectors (also known as flexibles or cathodic flexibles) (06) which have a given depth dimension (07).

Figure 2A:
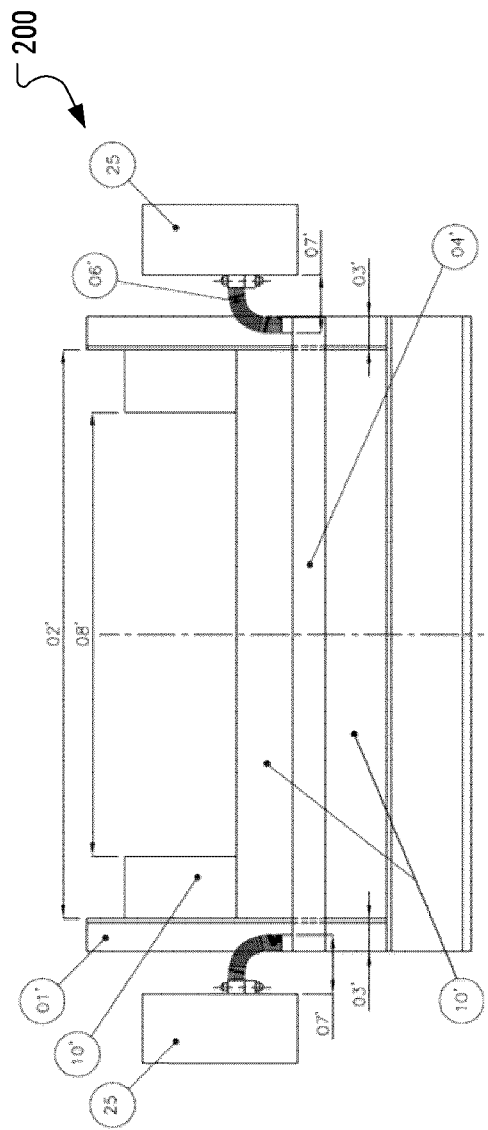
FIG. 2A illustrates, in sectional view, a simplified representative portion of a known aluminum cell structure with a low-profile sidewall support structure, as well as collector bars, bus bars and flexible electrical connectors.
Figure 2B:
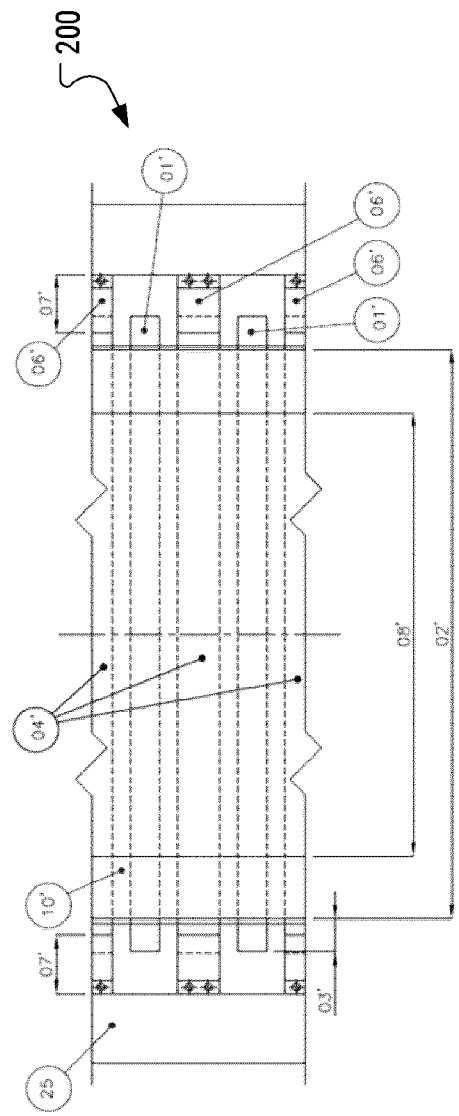
FIG. 2B illustrates, in plan view, the portion of the aluminum cell illustrated in FIG. 2A.

FIGS. 2A and 2B illustrate a simplified representative portion of a known aluminum cell 200 with a low-profile sidewall support structure (01').

The aluminum cell 200 includes an internal area (02'), lining (10'), an internal production area (08'), a current collector bar (04'), bus bars (25) and flexible electrical connectors (one of which is associated, in FIG. 2A, with reference numeral 06'). The flexible electrical connectors (06') of FIG. 2A have a depth dimension (07').

For the cradles to be sufficiently thin, that is, for the sidewall support structure (01') to have a sufficiently reduced depth dimension (03'), such as the cradles described in published patent application PCT/CA2015/051213, the ability to maximize the internal cell dimensions becomes limited by the depth dimension (07') of the flexible connectors (06'). Accordingly, to increase the internal production area (08') within the same cell footprint, it becomes desirable to reduce the depth (07') of the flexible electrical connectors (06').

Figure 3A:
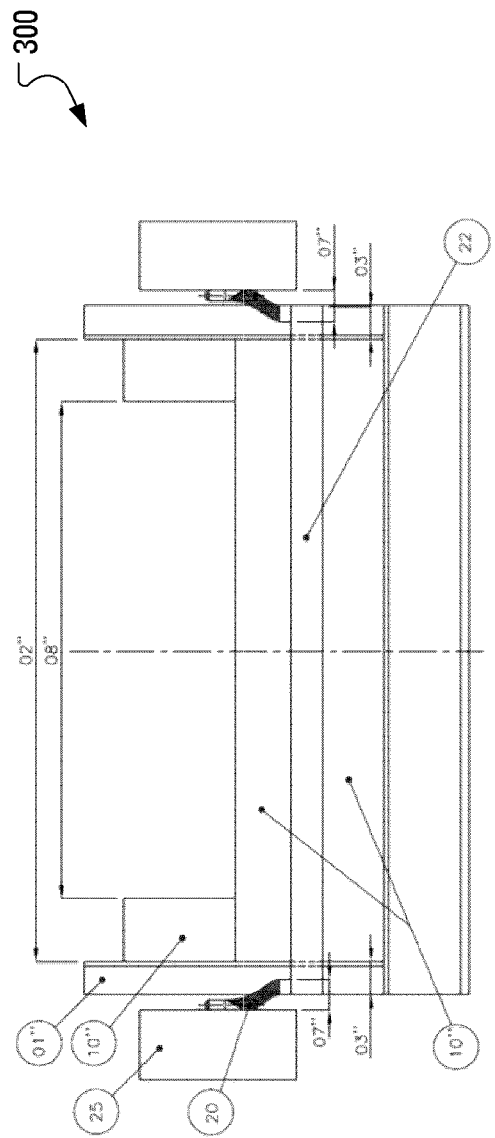
FIG. 3A illustrates, in sectional view, a simplified portion of an aluminum cell structure with a low-profile sidewall support structure as well as collector bars, bus bars and, in accordance with aspects of the present application, flexible electrical connectors.
Figure 3B:
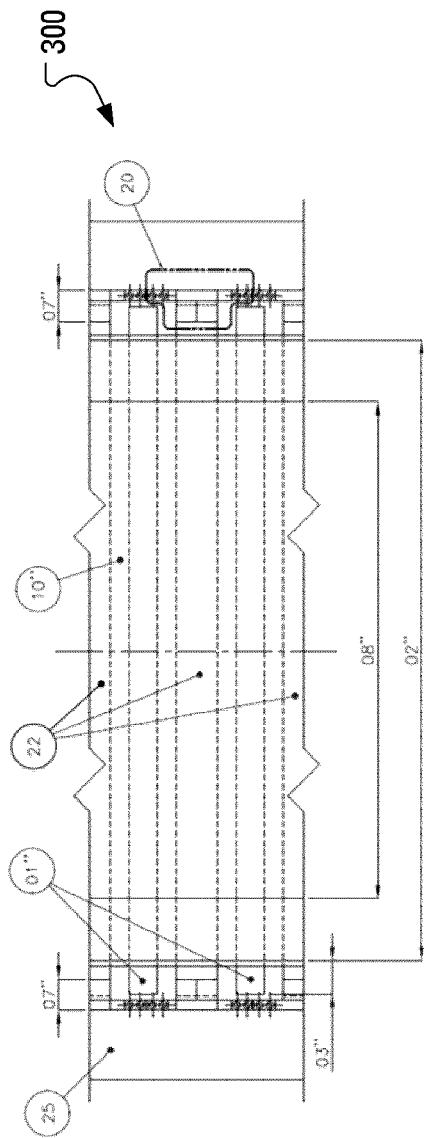
FIG. 3B illustrates, in plan view, the portion of the aluminum cell illustrated in FIG. 3A.

FIGS. 3A and 3B illustrate a simplified representative portion of an aluminum cell 300 with a low-profile sidewall support structure (01").

The aluminum cell 300 of FIGS. 3A and 3B, which embodies aspects of the present application, includes an internal area (02"), a sidewall lining (10"), an internal production area (08"), a current collector bar (22), bus bars (25) and flexible electrical connectors (one of which is associated, in FIG. 3A, with reference numeral 20). The flexible electrical connectors (20) of FIG. 3A have a depth dimension (07").

Historically, flexible electrical connectors for electrolytic cells and aluminium pots have been designed with the goal of optimizing electrical parameters, and allowing for adequate flexibility. In terms of electrical parameters, these connectors have been designed to achieve a required current carrying capacity without overheating or otherwise degrading. It is known that overheating further increases resistance and, therefore, generates even more heating. As well, these connectors have been designed to contribute as little as possible to an overall cell voltage drop and, accordingly, have been designed with minimal resistance. In terms of flexibility, the connectors have been designed to allow for movement of the current collector bars (due, primarily, to thermal and chemical expansion or contraction of the cell contents) relative to the bus bars (which also move due to thermal expansion and other factors). In addition, flexibility of the connectors is useful in that such flexibility allows for easier alignment, connection and disconnection of the connectors by the operators. Furthermore, the flexibility allows the connectors to adapt to slight divergences from designed clearances that are encountered in practice.

Figure 4:
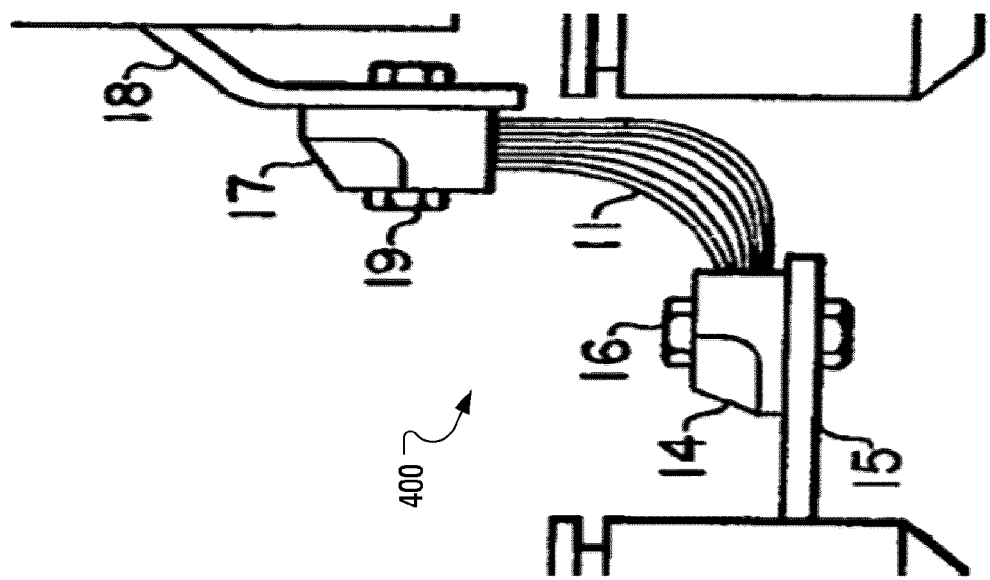
FIG. 4 illustrates, in a side elevation view, a known flexible electrical connector with flexible metal sheets and connections to an anode bus bar and a cathode bus bar.

A conventional flexible connector assembly 400 is illustrated in FIG. 4 and described in U.S. Pat. No. 3,783,122 issued to H. Inoy et al. on Jan. 1, 1974. The design of the conventional flexible connector assembly 400 includes a flexible intercell connector (11), comprised of conductive metal sheets. The flexible intercell connector (11) is joined via an attachment means (14), using one or more bolt and nut (16), to an anode bus bar (15). The flexible intercell connector (11) is also joined via another attachment means (17), using one or more bolt and nut (19), to a cathode bus bar connection (18).

Referring back to FIG. 1A, minimizing the depth dimension (07) of the cathodic flexible connectors (06), in order to maximize the internal production area (08) of the aluminum cell 100, has not been a goal for designers in the past. Recent advances, such as those outlined in Patent Application Publication No. PCT/CA2015/051213, allow for a significant reduction in the depth dimension (03, 03') of the sidewall support structure (01), making the depth dimension (07, 07') of flexible electrical connectors (06, 06') the limiting factor in maximizing a potshell's internal area (02, 02') available to the lining (10, 10') and the electrodes, and consequently the internal production area (08, 08') available to the electrodes. This is shown in FIG. 2A, where the depth dimension (07') of the flexible electrical connectors (06') has become the main bottleneck in realizing further increases in internal production area (08') for the same cell footprint. Conventional flexible electrical connector designs do not allow for significant reductions in the depth dimension (07') beyond a certain point.

Conventional flexible electrical connectors are appropriate when the spacing between collector bars (04), or the potshell wall and bus bars (25) is relatively large. However, as this spacing is reduced (e.g., through reductions in the sidewall support structure (01), for example, using the designs described in PCT/CA2015/051213), two significant problems arise with conventional flexible electrical connector designs. First, the flexibility of the flexible packs becomes limited, as similar relative movements acting on relatively shorter sheets cause more strain, particularly in the cell's longitudinal direction. In some cases, designers use excess length of the flexibles in loose arcs to maintain the required flexibility, but the available space for practical loose arcs also becomes compromised as the depth of the flexible electrical connectors becomes reduced. Second, the depth of connections, such as bolted or fastened connections, which are made in line with the flexible electrical connectors, removes available space for the flexible sheets and limits the maximum internal width of the potshell.

Another limitation of electrical connectors, known to those skilled in the art, is the electrical contact resistance across non-bonded surfaces, such as across bolted connections. This contact resistance provides a major contribution to the voltage drop across a given cell, leading to a large amount of electricity being wasted as heat. In general, aluminum cells avoid bolted or fastened connections as much as possible, in favour of bonded connections (such as by welding). However, many modern cells may include bolted or fastened connections to facilitate installation and removal of individual cells, to facilitate re-use of the flexible connections themselves, to facilitate disconnection of specific cathodes and when welding is unpractical due to the pot room environment, space constraints, lack of required expertise and other factors.

The magnitude of the contact resistance can be reduced by increasing the contact area through which electricity is conducted, increasing the contact pressure across these non-bonded areas (with diminishing returns at higher pressures), and/or treating the contact surfaces in some way (e.g., sanding or applying/inserting a resistance-reducing material across the surface). Surface treatment is often time-consuming and/or expensive, while increasing contact area and pressure is often limited by physical considerations (e.g., size and number of fasteners, available space and installation/removal costs). In general, as the depth dimension of flexible electrical connectors is reduced, there is less space available to increase the contact area or the size and number of fasteners.

In overview, aspects of the present application relate to a flexible electrical connector designed to achieve a reduced distance between the collector bars (or potshell sidewall) and the bus bars, thereby allowing for a maximizing of the internal dimensions of an aluminum cell with a sufficiently thin support structure, while still meeting other practical design considerations. In other aspects of the present application, the electrical contact resistance resulting from a typical fastened connection may be reduced in a space-efficient manner. Such a reduction of electrical contact resistance may be regarded as useful in that the space available for connections is minimized (e.g. when increasing the internal production area within a given cell footprint).

Figure 5:
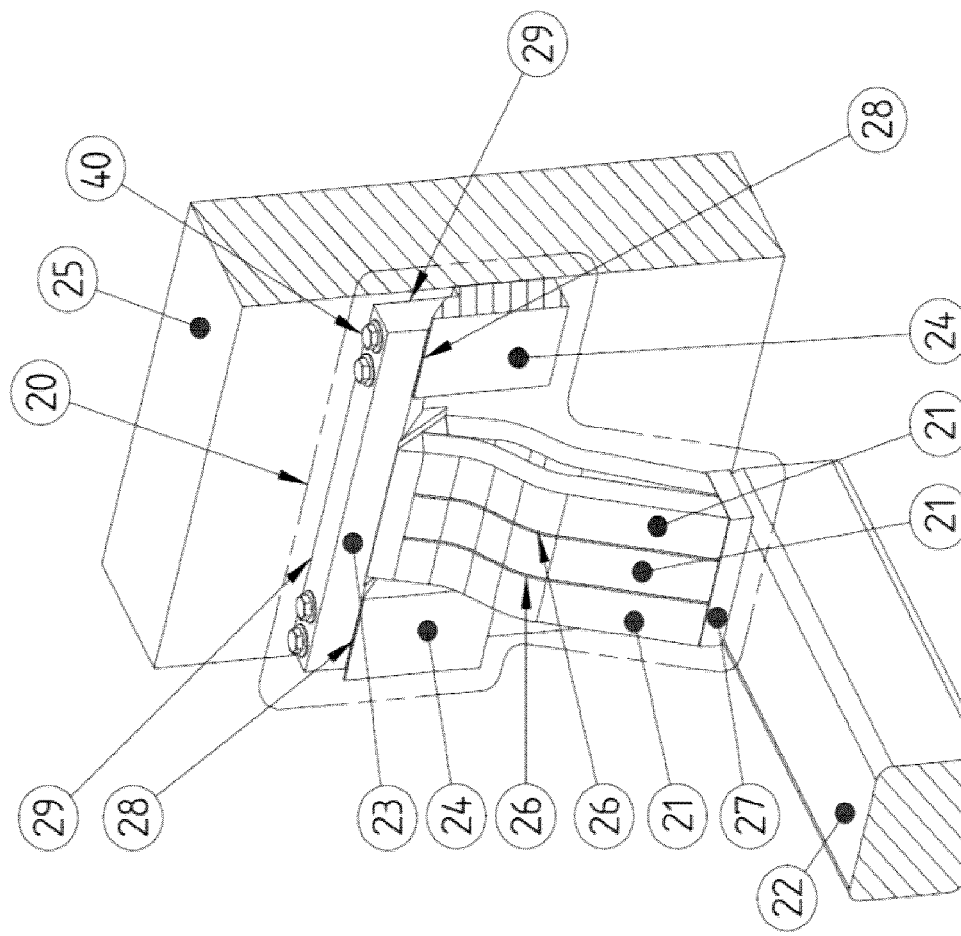
FIG. 5 illustrates, in a trimetric view, a flexible electrical connector arrangement according to aspects of the present application.
Figure 6:
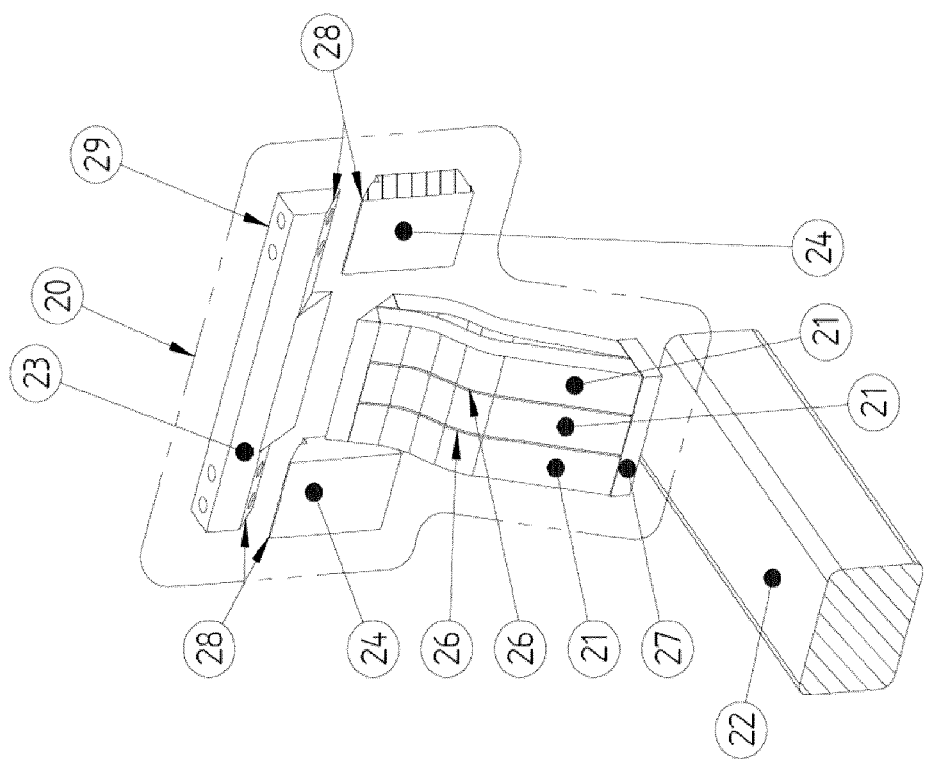
FIG. 6 illustrates, in an exploded trimetric view, the flexible electrical connector arrangement of FIG. 5.

In one embodiment, illustrated in FIGS. 5 and 6, a flexible electrical connector (20), comprising flexible packs of conductive metal sheets (21) (the individual metal sheets are not shown) is initially welded or otherwise joined to a collector bar mating component (27). The collector bar mating component (27) is welded to the collector bar (22) at the collector bar end of the pack of conductive metal sheets (21). The bus bar end of the pack of conductive metal sheets (21) is joined to a connector block 23. The connector block 23 has an angled mating surface, or angled wedge (28, 29), which can interface with a similar mating surface on receiver blocks 24 and or bus bar (25). During installation, the angled, wedge-shaped connector block (23) may be bolted, fastened or otherwise joined to the receiver blocks (24) and to the bus bar (25), which is not shown in FIG. 6. The receiver blocks 24 are welded or otherwise joined to the bus bar (25) on both sides of the flexible packs (21). Notably, a single receiver block 24 may be welded or otherwise joined to the bus bar (25) on only one side of the flexible packs (21).

Notably, FIGS. 5, 6 and 7 are broken to show only half of each receiver block (24) (each of which are shared with a connector block of a neighbouring assembly in this embodiment). Further, one or more longitudinal slits (26) may exist along the length of the flexible packs (21). Thus, this embodiment has two main aspects: a) connections between connector block (23) and bus bar (25) that are offset to either or both sides of the flexible packs (21) and collector bar (22);

and b) an angled, wedge-shaped, connector block (23) that mates with the angled receiver block (24) attached to the bus bar (25).

By using the connector block (23) that is connected to the bus bar (25) on either side of the flexible packs (21), a much lower profile connection is possible, as bolted or fastened bus bar connections (40) are on either side of the flexible elements (21) rather than in-line with the flexible elements (21). The arrangement allows the connection between the flexible electrical connector (20) and bus bar (25) to be made in a direction offset from the longitudinal axis of the collector bars (22) and still allows the axis of the bolts or fasteners to be vertical, if desired for ease of assembly and dis-assembly. This is illustrated in FIGS. 3A and 3B, where the flexible electrical connector (20) incorporating an offset bolted or fastened connection (40) allows for a reduction in flexible electrical connector depth dimension (07″) and an increase in the maximum internal width (02″) of the potshell. In some cases, though not shown in FIGS. 3A and 3B, this offset prevents what would otherwise be a limiting factor for the growth of the internal width (02″) of the potshell: a clash between the end of the collector bar (22) and the receiver block (24) during cell assembly. In general terms, this offset connection is shown in FIG. 7A, and can be described as a connection (40) made between the flexible connector and the bus bar (25), whereby, when viewed vertically above, such a connection (40) is made substantially outside the limits of the collector bar, and the extension of the limits of the collector bar, if those limits extended out to the fundamental plane defining the inner bus bar surface facing the electrolytic cell (83). That is, the connection (40) is made substantially outside of the limits associated with the hatched area (82), when viewing the cell from above.

The flexible packs (21) may be designed to provide a minimum cross-sectional area to limit, to an acceptable degree, a current density throughout the connector (20). To further decrease the depth dimension (07″) of the flexible electrical connector (20), the sheets in the flexible packs (21) may be attached (e.g., by welding) to the angled connector block (23), thus decreasing the plan view thickness of the connector block (23) itself. Notably, when the connector block (23) is thin but tall with an angled connection surface, the connector block (23) can provide a larger area for connection of the flexible packs (21), while minimizing the thickness for the connector block (23). This approach can be used with or without the wedge-shaped connector to receiver interface (28, 29) described below.

As illustrated in FIG. 7B, the bus bar (25) and collector bars (22) may move relative to each other in the longitudinal direction (arrows 80, 81) of the cell, primarily due to thermal and chemical growth or contraction of the cell as well as due to facilitate cell assembly and other factors. However, as the length of the flexible elements (21) are reduced, their ability to accommodate this longitudinal movement (80, 81) becomes limited. To overcome this problem, the flexible electrical connectors feature one or more slits along the length (in the primary current carrying direction) of the flexible pack (26), to significantly reduce the total area moment of inertia in bending and the total polar moment of inertia in twisting. By reducing these moments of inertia, the flexible elements (21) can more readily twist and bend to accommodate cell movements. This allows for better flexibility, reduces overall stresses and reduces forces that may serve to loosen any bolts or fasteners or have other negative consequences.

There are relative movements between the collector bars (22) and the bus bars (25) in the other primary directions as well. However, these movements are easily accommodated by the prior art, as the thin sheets are already flexible in these directions.

It is often desired to include bolted or fastened connections, to facilitate installation and removal of cells, to facilitate re-use of the flexible connections themselves, to facilitate disconnection of specific cathodes and when welding is unpractical. It is widely known that the contact resistance across bolted or fastened connections is a significant contributor to energy being wasted as heat. The magnitude of the contact resistance can be reduced by increasing the contact area through which electricity is conducted, increasing the contact pressure across these areas (although with diminishing returns) or treating the contact surfaces in some way. Surface treatment methods include sanding of surfaces, plating or insertion of metal foam between the two surfaces. However, such surface treatment techniques are typically expensive and/or time consuming and often need to be repeated or replaced each time the connection is separated.

FIG. 8 illustrates the known flexible connector assembly of FIG. 4 with added vectors of the forces acting on the attachment means (14) and anode bus bar (15) due to the tension of the bolt (16) (shown as $F_{bolt}$). If a person skilled in the art wishes to increase the electrical contact area or pressure for such a flexible connector, they would do so by increasing the area of the contact surface and increasing the size and number of fasteners, such as the bolted connection. However, such an approach is limited, as the ultimate size of the contact surface is limited by the minimum clearance between bus bars and current collector bars (or cradles) required during operation and installation, as well as the distance between adjacent connections. Further, as current flow favours the path of least resistance, current will tend to flow through the bolted or fastened sections closest to the flexible elements, where the conduction length is shortest, assuming equal contact resistance.

Figure 9B:
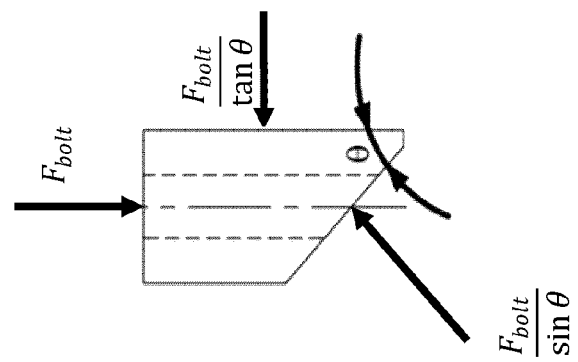
FIG. 9B illustrates a free-body diagram of the connector block of FIG. 9A.
Figure 9A:
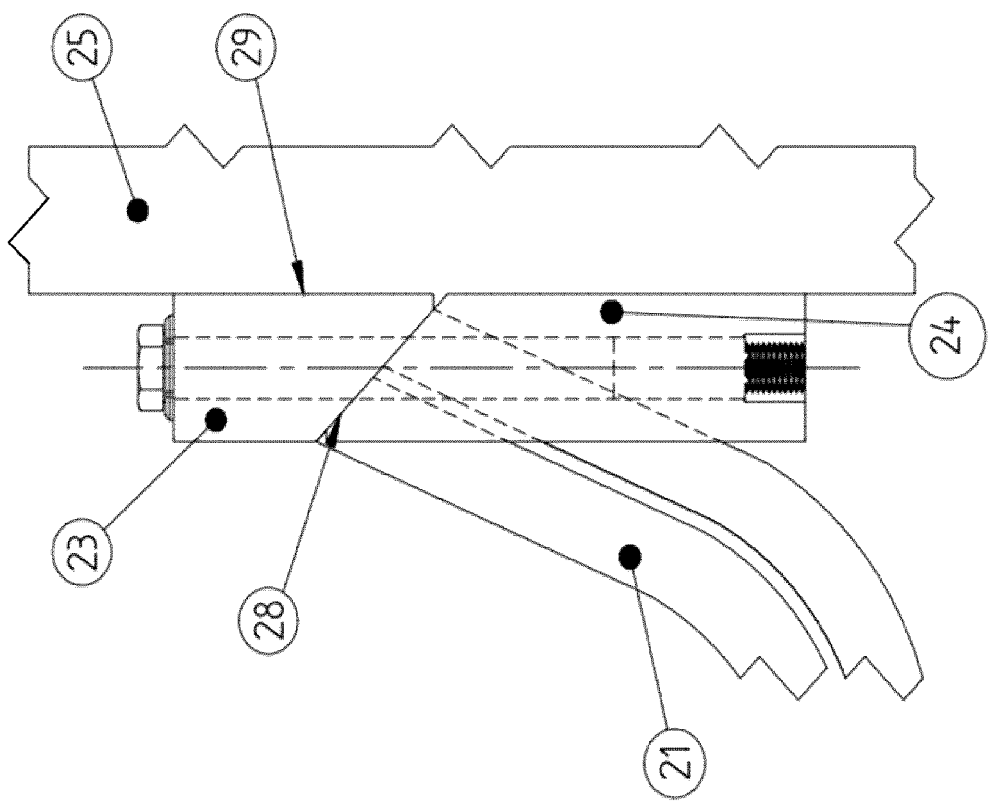
FIG. 9A illustrates, in a side elevation view, connection detail for a flexible electrical connector arrangement including a connector block according to aspects of the present application.

FIG. 9A illustrates use of a wedge-shape for the connector block (23) which allows for a significant increase in both contact area and contact pressure, all other factors being held equal (e.g., collector bar (22) to bus bars (25) spacing, size and number of bolts or fasteners. By using a wedge, more contact area is available (across both the angled and vertical faces (28, 29) for the image shown in FIG. 9A) for the connector block (23) footprint in plan view, compared to a standard horizontal or vertical connection. Further, as shown in the free-body diagram of the connector block in FIG. 9B, the mechanical advantage of a static wedge multiplies the compressive normal force applied by the bolt (shown as $F_{bolt}$ in FIG. 9B) or fastener (or possibly held by friction alone for small wedge angles) across the electrical contact surfaces (28, 29), resulting in higher pressures and lower contact resistance losses. Finally, the wedge shape allows for a more uniform application of pressure across the entire contact area (28, 29) (the angled and vertical faces are applying force to each other which further distributes the pressure), unlike a traditional bolted or fastened connection, which applies a higher pressure closer to the bolted or fastened area. Note that higher pressures above a certain limit do not appreciably reduce the electrical contact resistance. Accordingly, a more evenly distributed pressure is often desirable. Note, also, that the effect of friction has not been explained here and may limit practical application of the wedge to a range of wedge angles, mating materials and surface conditions. The wedge connection may or may not be used in conjunction with other electrical contact resistance mitigation measures such as various surface treatments. Note that the individual metal sheets are not shown in the flexible metal packs (21).

Despite the clear advantages of a wedge compared to traditional bolted or fastened connections, such a concept has not previously been applied by those skilled in the art to reduce voltage drop across such connections in electrolytic cells. The wedge type description above can be further generalized as mating components with two or more matching pairs of mating surfaces across which the components are in electrical contact, where the pairs of mating surfaces are neither substantially parallel nor substantially coplanar and a means of securing the matching mating components against one another, such that a normal reaction force is generated on all pairs of mating surfaces. The normal reaction force is generated on the mating surfaces through the application of a force applied by a fastener or by frictional forces.

Figure 10:
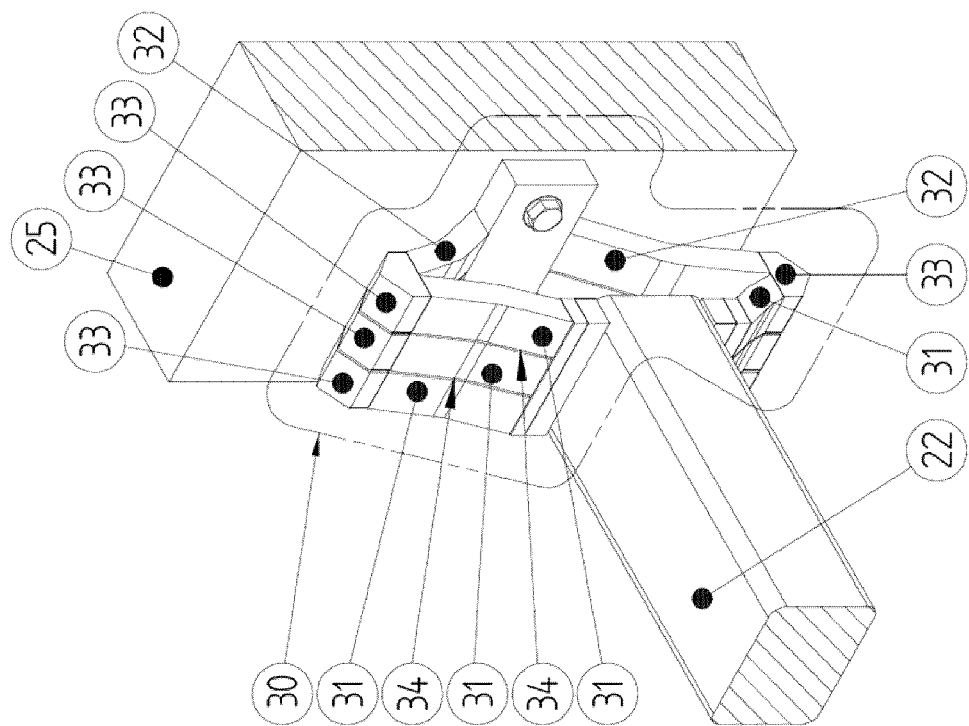
FIG. 10 illustrates, in a trimetric view, a flexible electrical connector arrangement according to aspects of the present application.

In another embodiment, illustrated in FIG. 10, two sets of flexible packs of thin metal sheets (31 and 32) (the individual metal sheets are not shown) are joined together at one of each of their ends, either directly or through intermediate connector blocks (33), by welding or other means. Of the two ends of this combined assembly, one end is connected to the collector bar (22), while the other end is connected to the bus bar (25). Between these two end connections, the predominant current carrying direction of the flexible connector is changed by more than 90 degrees. Two or more of the combined assemblies described here may be used on one collector bar (22). For example, one combined assembly may be connected to the top side of the collector bar (22) while another may be connected to the bottom side (as illustrated in FIG. 10). Electrical insulation may be incorporated if required to prevent short circuits (e.g., if two flexible packs (31, 32) come into contact, due to relative movements, at a point away from their intended contact points). One or more slits (34) may be incorporated along the length of the flexible packs to improve flexibility (in a similar manner as was discussed above for a separate embodiment).

As the depth dimension (07) of conventional flexible electrical connectors (see FIG. 1A) is reduced, it becomes more difficult for the flexible packs (21) to accommodate the relative movements between the collector bars (22) and the bus bars (25), particularly in the cell's longitudinal direction (80, 81), as illustrated in FIG. 7B. To maximize the flexibility of the flexible packs (21) as the depth of flexible electrical connector is reduced, it is beneficial to maximize the length of the flexible packs (21). This maximization of length allows better flexibility in response to longitudinal movements of the cell relative to the bus bars (25).

One way to increase this length is to allow the connection of the flexible electrical connector (20) with the bus bar (25) to be made substantially above or below the connection point of the connector (20) with the collector bar (22). However, space constraints, bus bar height and interference issues with other cell components, among other reasons, may necessitate that the connection between the connector (20) and the bus bar (25) be made at roughly the same elevation as the connection between the connector (20) and the collector bar (22). As a result, to ensure sufficient flexibility, a minimum length of the flexible electrical connector (20) may be bent, such that the current carrying direction is changed by more than 90 degrees to accommodate the proper connection points between the collector bar (22) and the bus bar (25).

Figure 11:
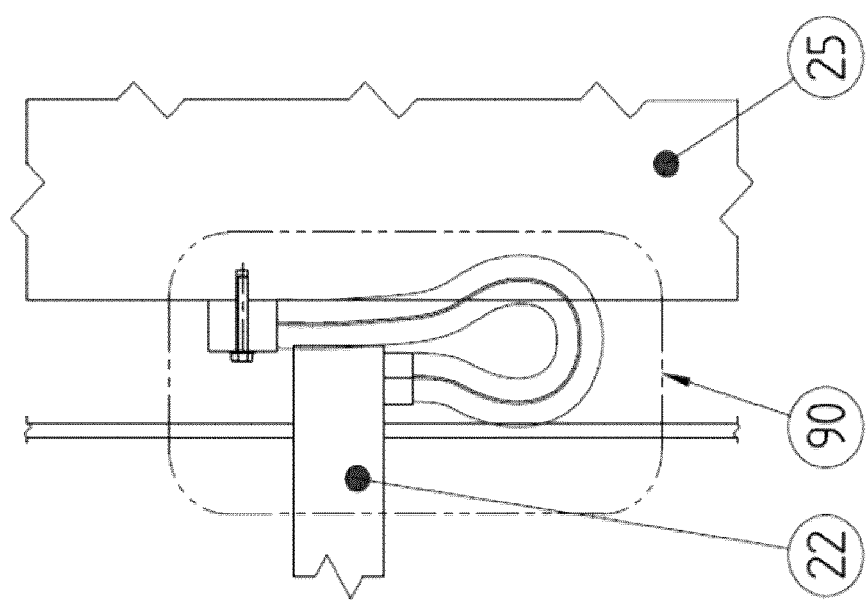
FIG. 11 illustrates, in a side elevation view, the equivalent condition of connection detail for a known flexible electrical connector arrangement, along with resulting interferences with cell components, if the distance between its connection points with the collector bar and bus bar are sufficiently reduced.

FIG. 11 illustrates known flexible electrical connector arranged such that the distance between its connection points with the collector bar (22) and the bus bar (25) is significantly reduced and such that the connection between the known flexible electrical connector and the collector bar and the connection between the known flexible electrical connector and the bus bar are to be made at roughly the same elevation. The individual metal sheets that comprise the known flexible electrical connector are not shown. Such a known flexible electrical connector employs a large U-shaped bend to elastically change direction, with both a minimum elastic bend radius and a minimum flexible length for adequate flexibility in all directions that, combined together, require a large volume for the re-direction. Such a large, free and elastic loop would sufficiently accommodate longitudinal cell movements. However, since the distance between the collector bar (22) and the bus bar (25) has been greatly reduced, the free and elastic bend would now interfere unacceptably with cell components. FIG. 11 illustrates an example assembly (90) wherein the free and elastic bend in the known flexible electrical connector unacceptably interferes with the potshell and bus bar. Furthermore, the free and elastic bend in the known flexible electrical connector may contact those components and provide an inappropriate and unpredictable electrical conduction path. Further, the cell designer may choose to allow a minimum air gap between the flexible electrical connector and other electrolytic cell components, in order to primarily meet electrical design requirements (e.g., to prevent short circuiting). In addition, such a free and elastic bend could restrict access to other electrolytic cell elements, especially as the depth of connectors and, in turn, the gap between the potshell and bus bar (25), is reduced.

FIGS. 12A-12E illustrate five different aspects of the present application in which a flexible connector is tightly redirected in a manner intended to achieve a change of current carrying direction of more than 90 degrees within a low potshell-to-bus-bar gap. In all five of these figures, the flexible elements are comprised of packs of thin metal sheets, however the individual sheets are not shown.

Figure 12A:
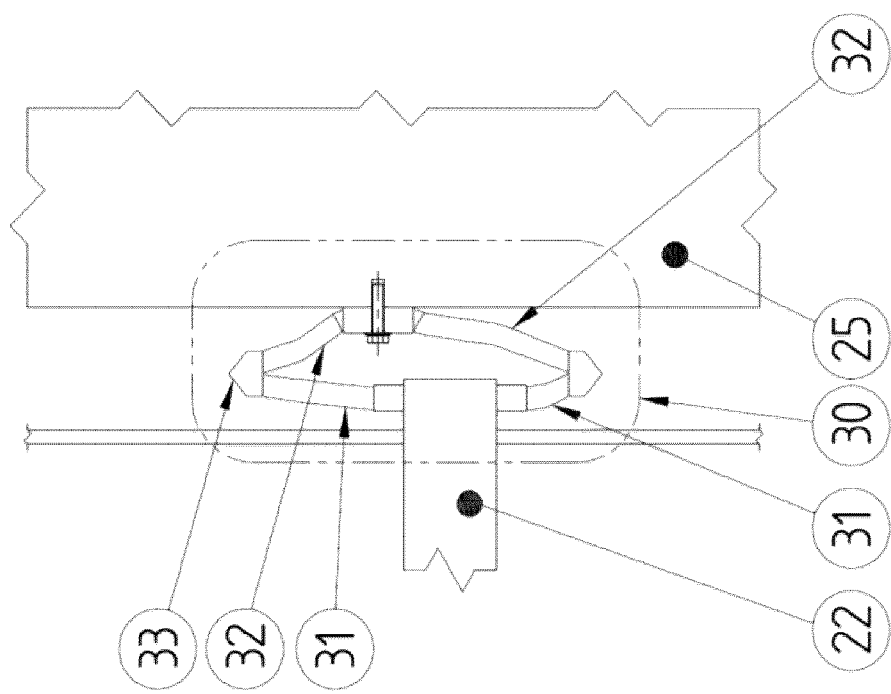
FIG. 12A illustrates, in a side elevation view, the flexible electrical connector arrangement of FIG. 10, wherein a tightly redirected flexible connector uses intermediate connection blocks to achieve a low-profile bend in accordance with aspects of the present application.

FIG. 12A illustrates, in a side elevation view, the flexible electrical connector arrangement of FIG. 10, wherein a tightly redirected flexible connector uses intermediate connection blocks to achieve a low-profile bend in accordance with aspects of the present application. This embodiment incorporates a tightly redirected assembly (30), by using the intermediate connection blocks (33) with corresponding flexible packs of thin metal sheets (31, 32) attached to different sections of each intermediate block (33), such that current flows from the collector bar (22) through one pack (31) through the intermediate block (33) and towards the other pack (32) and into the bus bar (25). The intermediate connection block may also comprise a weld only instead of a welded block. Such an arrangement avoids the free and elastic bend required by the arrangement shown in FIG. 11 and allows for a more than 90 degree change in the current-carrying direction of the flexible connector.

Figure 12B:
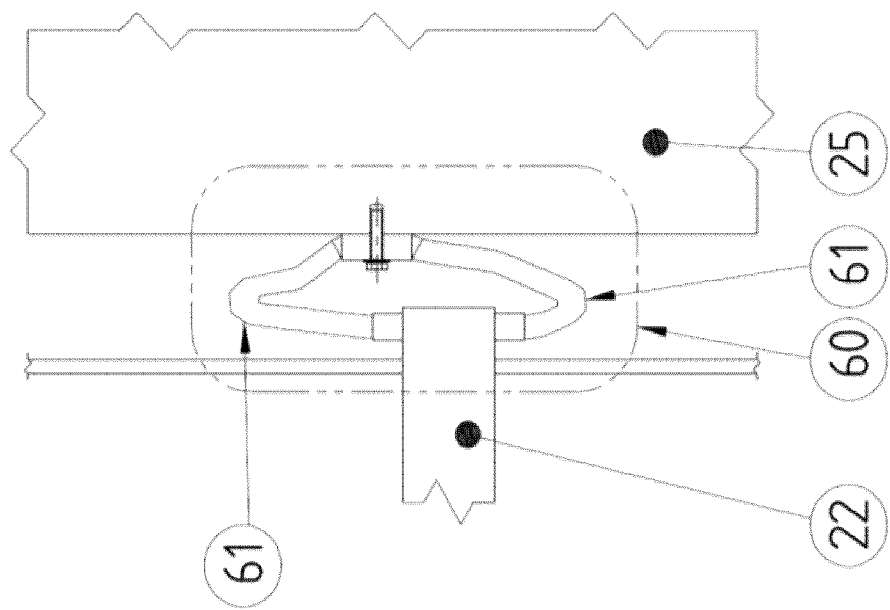
FIG. 12B illustrates, in a side elevation view, connection detail for a tightly redirected flexible connector that uses plastic deformation bending in at least one location of at least some of the sheets to achieve a low-profile bend in accordance with aspects of the present application.

Another aspect of the present application is illustrated in FIG. 12B, which illustrates a flexible electrical connection arrangement (60) with a tightly redirected bend. The bend allows for a more than 90 degree change in the predominant current-carrying direction of the flexible connector. This embodiment incorporates flexible elements (61) in a parallel electrical arrangement, attached to either side of the collector bar (22) and joining to meet a substantially common connection point with the bus bar (25). The connection points at either the collector bar (22) or the bus bar (25) may be welded, bolted or otherwise held in place. At the bends required to achieve the more than 90 degree change of the predominant current-carrying direction, plastic deformation bending is used in at least one location of at least some of the sheets to achieve what is overall a relatively compact low-profile bend of the entire flexible element. Some of the sheets may have bends that are entirely elastic, but are still held in a compact manor by the other plastically deformed sheets. In another manner, two or more sheet subgroups may have identical bends to each other in the sub-group or in still another manner, each individual sheet could have different bends at different locations.

Figure 12C:
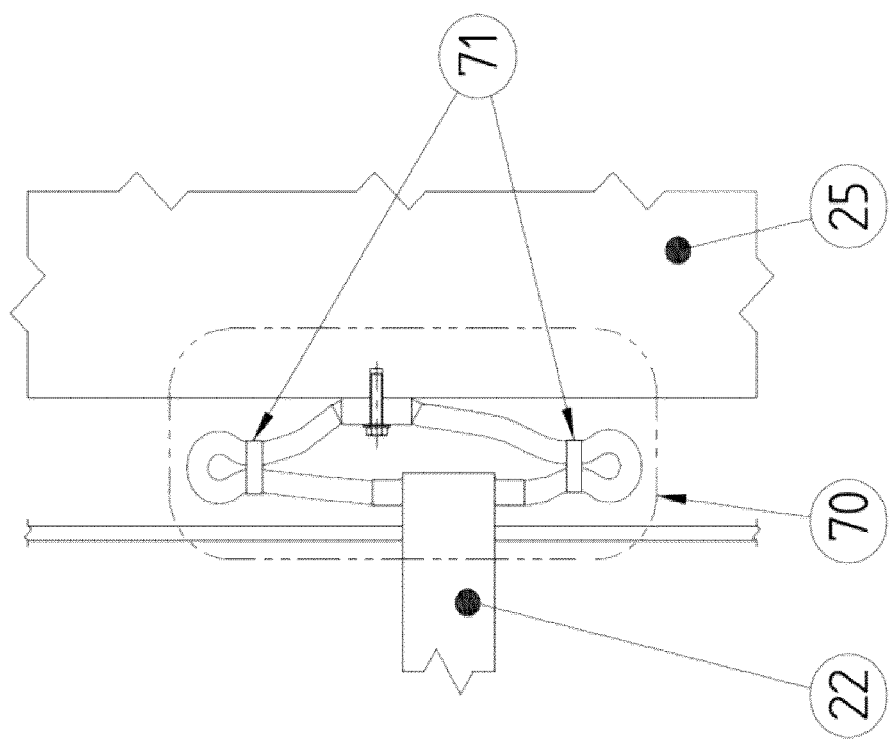
FIG. 12C illustrates, in a side elevation view, connection detail for a tightly redirected flexible connector that uses straps to hold the portions of the bends together to achieve a low-profile bend in accordance with aspects of the present application.
Figure 12D:
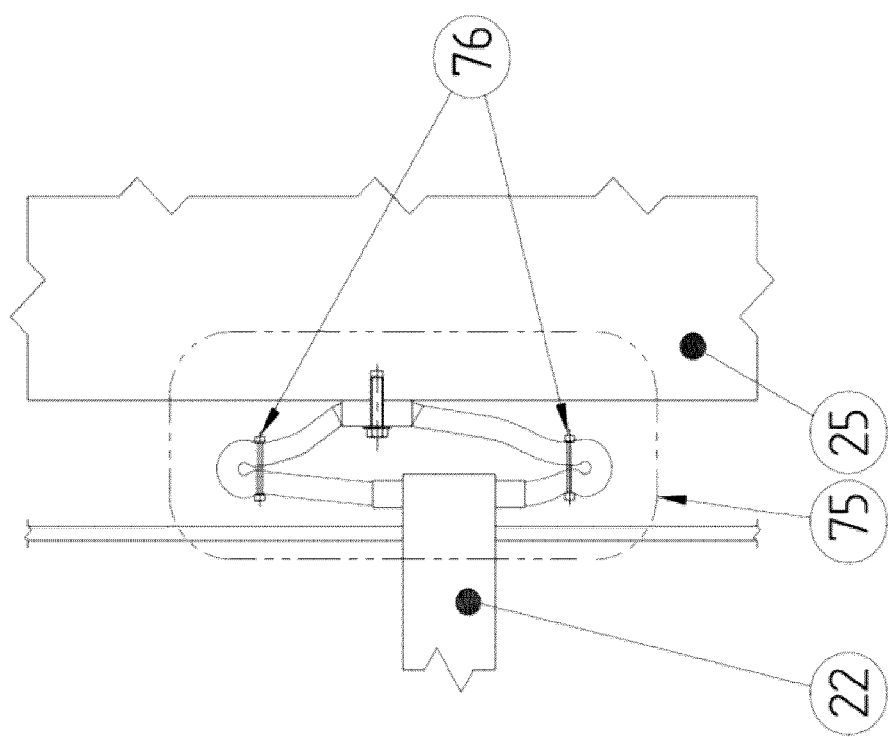
FIG. 12D illustrates, in a side elevation view, connection detail for a tightly redirected flexible connector that uses fasteners to hold the portions of the bends together to achieve a low-profile bend in accordance with aspects of the present application.

Two other aspects of the present application, incorporating a tightly redirected bend, are shown in FIGS. 12C and 12D. In these figures, the normally free and elastic shape of the flexible elements, at the bends that achieve the more than 90 degree change of the current-carrying direction, are restricted using straps (71, FIG. 12C) or bolts (76, FIG. 12D) such that the flexible electrical connection arrangement (70, 75) no longer unacceptably interfere or contact other electrolytic cell components. In yet other embodiments, other types of fasteners can be used to restrict the free and elastic shape of any bends.

Figure 12E:
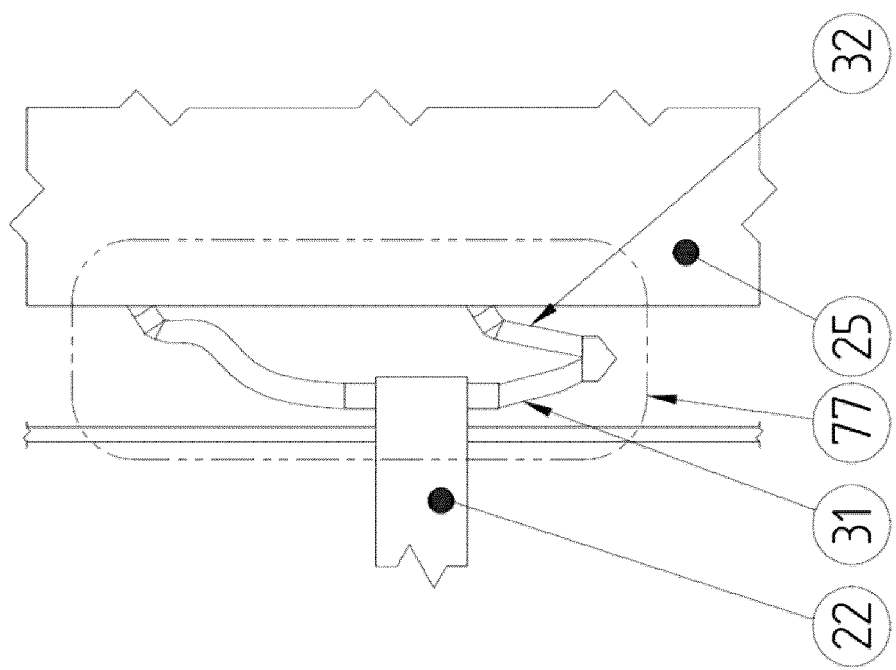
FIG. 12E illustrates, in a side elevation view, connection detail for a tightly redirected flexible connector that uses tight redirection on only one of the parallel electrical paths, in accordance with aspects of the present application.

A further embodiment, illustrated in FIG. 12E, illustrates only one of the current carrying parallel electrical paths incorporating a tightly redirected bend (31, 32). This flexible electrical connection arrangement (77) also shows the current carrying parallel electrical paths connecting to the bus bar (25) at substantially different points.

The low-profile flexible electrical connectors shown in all of the embodiments of FIGS. 12A, 12B, 12C, 12D and 12E also increase flexibility and reduce the depth dimension by incorporating multiple flexible elements in a parallel electrical arrangement, stemming from multiple sides of the collector bar (22). For example, in FIG. 12A, electrical paths stem from above the collector bar (22) and below the collector bar (22). Such a parallel arrangement reduces the total thickness of each of the packs (31, 32) of thin metal sheets that comprise the flexible elements and allows for tighter spacing between the collector bar (22) and the bus bars (25), as well as allowing for improved heat transfer from the flexible elements. In addition, by reducing the total thickness of each of the packs of metal sheets (31, 32), the required length of the collector bar (22) can been shortened, when compared to the length of the collector bar (22) seen in FIG. 11. This allows for less interferences between the collector bar (22) and other components; and more design flexibility, for a given flexible connector depth.

In all of these embodiments, electrical insulation can be used to prevent short-circuits across unwanted sections of the flexible connectors that are brought into contact with each other or through the added fasteners or other components. In addition, it will be apparent to those skilled in the art that these embodiments are also applicable for other bus bar configurations than shown in the figures.

Figure 13C:
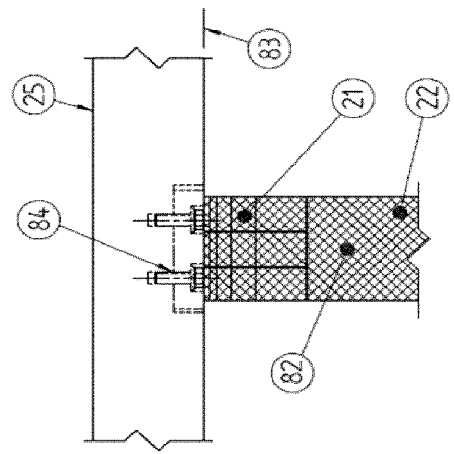
FIG. 13C illustrates, in a plan view, the flexible electrical connector arrangement of FIG. 13A
Figure 13B:
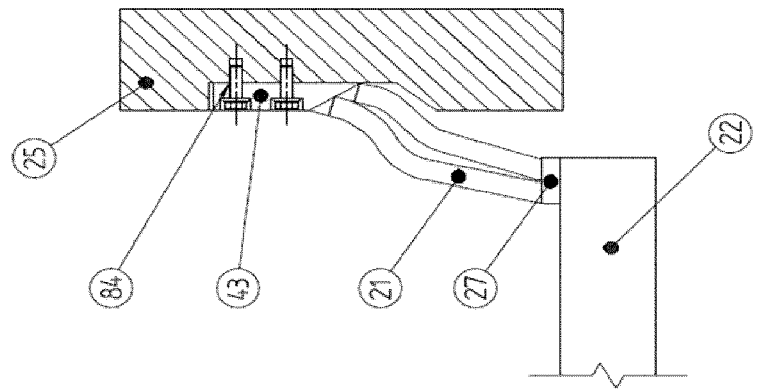
FIG. 13B illustrates, in an elevation view with partial section, the flexible electrical connector arrangement of FIG. 13A.
Figure 13A:
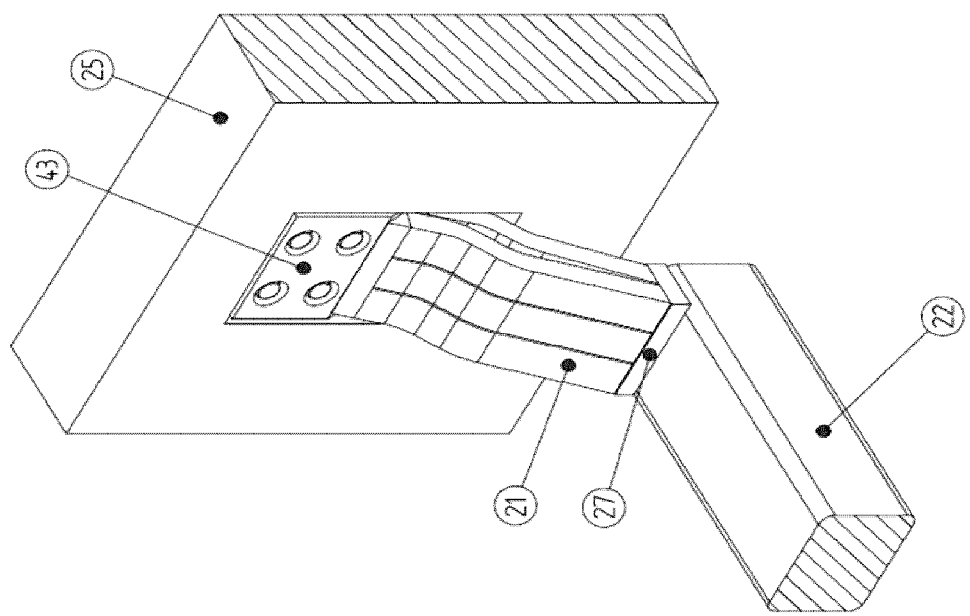
FIG. 13A illustrates, in a trimetric view, a flexible electrical connector arrangement according to aspects of the present application.

To further reduce the depth of the flexible connection, it may be desirable to attach the flexible electrical connector fully or partly within a recess (or pocket) in the bus bar (25). One embodiment is shown in FIG. 13A (trimetric view), 13B (elevation view) and 13C (plan view), incorporating a connector block (43) that is secured within a recess in the bus bar (25). The recess may be machined or otherwise removed from the body or sides of the bus bar (25). In other embodiments, the wedge-shaped connection discussed above may be formed into the recess to allow its further benefits to be realized simultaneously. In yet other embodiments, the flexible electrical connector may be welded or otherwise joined to the bus bar (25). As in the offset connection discussed hereinbefore, the recessed connection within the bus bar can be described as a connection (84) made between the flexible connector and the bus bar (25), whereby, when viewed vertically from above, such a connection is made substantially outside the limits of the collector bar, and the extension of the limits of the collector bar, if those limits extended out to the fundamental plane defining the inner bus bar surface facing the electrolytic cell. In FIG. 13C (plan view), the hatched area defining these limits (82) and the fundamental plane defining the inner bus bar surface (83) is shown for this embodiment. When viewing the cell in this view, it is apparent that the connections (84), particularly the point at which the connection mates the two electrical contact surfaces, between flexible connector and bus bar are made substantially outside of the hatched area (82). It can also be noted that the fundamental plane defining the inner bus bar surface (83) is not defined to include local minor variations from the fundamental bus bar surface. In order to account for such local minor variations in bus bar geometry that can routinely occur, for example due to fabrication tolerances or local minor surface machining that may be needed to prepare a bus bar electrical contact surface, the connection should be made substantially outside of a zone at least 5 mm away from the hatched area (82) defined here.

Figure 14B:
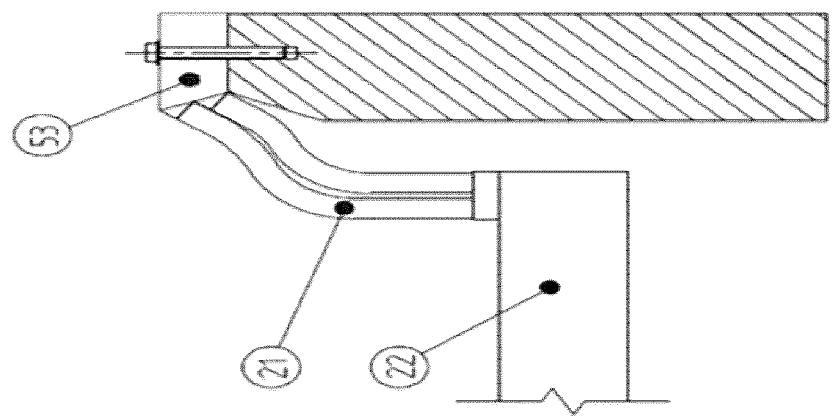
FIG. 14B illustrates, in an elevation view with partial section, the flexible electrical connector arrangement of FIG. 14A.
Figure 14A:
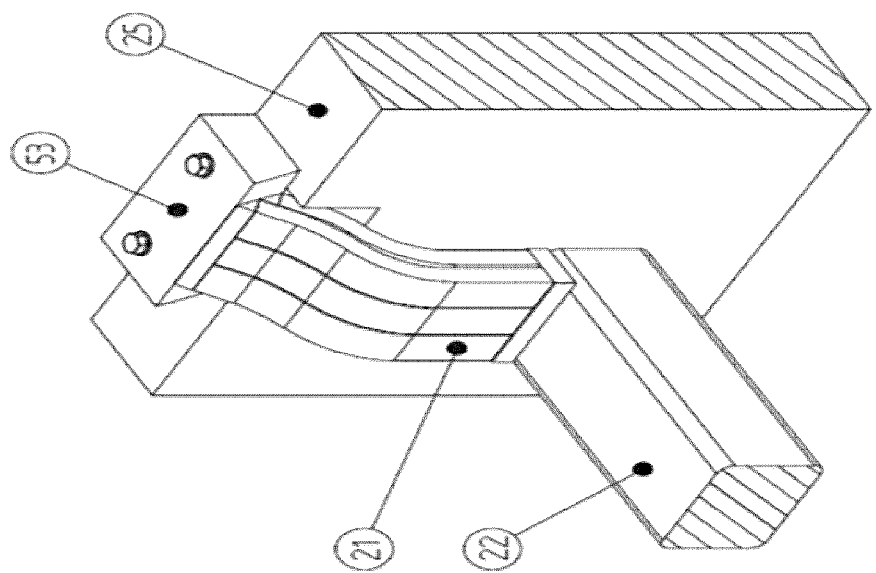
FIG. 14A illustrates, in a trimetric view, a flexible electrical connector arrangement having flexible element attached to a surface that required machining, or other method of material removal, into a top of a bus bar according to aspects of the present application.

In another embodiment, illustrated in FIG. 14A (trimetric view) and 14B (elevation view with partial section), the flexible electrical connector (21) mounts directly to what is substantially the top of the bus bar (25) via a connector block (53). In this specific case, a recess (or pocket) in the bus bar facilitates the flexible elements (21) to run below the normal upper surface and also beyond the inner surface of the bus bar allowing for flexible connection depth reductions (when looking in plan view). The recess may have required machining or other method of material removal. Other similar variations to this design are also considered. Notably, the wedge-shaped connection discussed hereinbefore may be formed into the top surface to allow the benefits associated with the wedge-shaped connection to be realized simultaneously for bolted or fastened connections. While any recess in a bus bar (25) does impact current carrying capacity for the bus bar, the effect of small recesses is localized and minimal enough that the overall benefits of reduced connection depth may outweigh the drawbacks. Note that the recess may be excluded and the flexible electrical connector may simply be fastened onto the top of the bus bar (25). As for some of the embodiments discussed hereinbefore, when viewed vertically from above, such a connection would lie substantially outside the limits of the collector bar, and the extension of the limits of the collector bar, if those limits extended out to the fundamental plane defining the inner bus bar surface facing the electrolytic cell.

It will be apparent to those skilled in the art that aspects of the present application may apply to other situations involving high amperage electrical connections between two or more pieces of equipment, where relative movement between the equipment must be accommodated, and where the gap between the equipment within which the electrical connection exists must be minimized or when contact pressure and area between electrical connections must be increased in a space efficient way.

Conveniently, aspects of the present application provide low-profile or reduced depth flexible electrical connectors, or an arrangement of such connectors, and other elements, to allow the production area of an electrolytic cell to be maximized for a given cell footprint.

Furthermore, aspects of the present application introduce an improved connection to decrease the contact resistance associated with non-bonded connections (such as fastened connections) in a space-efficient manner, without significantly impacting practical limitations such as installation time or cost.

Still further, aspects of the present application provide a low-profile flexible electrical connection arrangement, allowing for an increase in the internal dimensions of an aluminium cell (for a given cell footprint), especially when coupled with a potshell sidewall support structure that extends a relatively reduced depth beyond the inside of the potshell cavity.

Even further, aspects of the present application provide a low-profile flexible electrical connection arrangement, comprising of a connection or connections between the flexible arrangement and the bus bar, made in a direction offset from the longitudinal axis of the collector bar, when viewing the aluminium cell in plan view (for example, not in the hatched area associated, in FIG. 7A, with reference numeral 82). That is, the connections are not made in line with the collector bars and flexible electrical connectors, therefore allowing for a reduction in depth. Put more precisely, when viewed vertically from above (as in the plan view of FIG. 7A), the connections are substantially outside the limits of the collector bars (or the extension of the limits of the collector bars if those limits extended out to the fundamental inside plane (83) of the bus bars).

Aspects of the present application incorporate an electrical connection, comprised of pairs of matching mating surfaces (23 to 24 and 23 to 25, see FIG. 9A) where the pairs of mating surfaces are neither substantially parallel nor substantially coplanar (forming a wedge). A normal reaction force is generated on all pairs of mating surfaces when the components are secured (provided that the securing force is directed within the angle of the two surfaces). This connection allows for a substantial increase in electrical contact area and pressure, thus reducing contact resistance for a given footprint, and accommodating a reduction in the depth of a flexible electrical connector. More generally, all else being equal, this connection allows for a lower profile than can be made with a conventional bolted connection.

Further aspects of the present application incorporate other means of connecting the flexible elements to the bus bar and arranging and modifying the flexible elements to accommodate a reduction in the depth of the flexible electrical connector. More generally, these connections allow for a lower profile than can be made with conventional connections.

Aspects of the present application may be seen to overcome the limitations of known designs by allowing for an increase in the reactive area for a given electrolytic cell footprint. When employed in a potline of given area, aspects of the present application may be considered to allow higher production capacity to be achieved and/or lower the capital cost per tonne of production capacity, as compared to the state of the art. Aspects of the present application may also be seen to overcome the limitations of known designs by increasing electrical contact area and effective joint pressure at bolted or fastened connections for a given footprint, while supporting a reduction in the depth dimension (07, 07', 07") of the flexible electrical connectors.

The above-described implementations of the present application are intended to be examples only. Alterations, modifications and variations may be effected to the particular implementations by those skilled in the art without departing from the scope of the application, which is defined by the claims appended hereto.

What is claimed is:

1. A flexible electrical connector assembly adapted to connect a bus bar of an electrolytic cell to a collector bar of the electrolytic cell, the assembly comprising:
   an electrical connector including a plurality of conductive metal sheets, the electrical connector defining a current-carrying path and having a collector bar end and a bus bar end, the electrical connector adapted for being joined:
      at the collector bar end, to the collector bar; and
      at the bus bar end, to the bus bar; and
   a bend restrictor for maintaining a change in direction defined by a bend in the current-carrying path between the bus bar end and the collector bar end of the electrical connector;
   wherein:
   the electrical connector is configured to implement a change in direction in the current-carrying path defined by the plurality of conductive sheets at a bend defined between the bus bar end and the collector bar end, and
   the bend restrictor and the electrical connector are cooperatively configured such that:
      the bend restrictor restricts the bend such that the change in direction defined by the current-carrying path between the bus bar end and the collector bar end is greater than 90 degrees.

2. The flexible electrical connector assembly of claim 1; wherein:
   the bend restrictor includes a strap adapted to maintain the bend.

3. The flexible electrical connector assembly of claim 1; wherein:
   the bend restrictor includes a fastener adapted to maintain the bend.

4. The flexible electrical connector assembly of claim 3 wherein the fastener comprises a bolt.

5. The flexible electrical connector assembly of claim 1 wherein:
   the electrical connector comprises:
      a first electrical connector portion adapted for being joined to the collector bar at the collector bar end; and
      a second electrical connector portion adapted for being joined to the bus bar at the bus bar end;
   and
   the bend restrictor includes:
      at least one intermediate connector block having a first intermediate connector block section connected to the first electrical connector portion, and a second intermediate connector block section attached to the second electrical connector portion, the intermediate connector block providing an intermediate path carrying current between the first electrical connector portion and the second electrical connector portion, wherein the connection between the first electrical connector portion and the first intermediate connector block section and the connection between the second electrical connector portion and the second intermediate connector block section is with effect that the at least one intermediate connector block defines the change in direction of the electrical connector between the bus bar end and the collector bar end that is greater than 90 degrees.

6. The flexible electrical connector assembly of claim 1, wherein:
the electrical connector comprises:
a first electrical connector portion adapted for being joined to the collector bar at the collector bar end; and
a second electrical connector portion adapted for being joined to the bus bar at the bus bar end;
and
the bend restrictor includes:
an intermediate connector block providing an intermediate path carrying current between the first electrical connector portion and the second electrical connector portion, wherein the intermediate connector block comprises a weld formed between constituent sheets of the first electrical connector portion and the second electrical connector portion, the weld between the first electrical connector portion and the second electrical connector portion defining the change in direction between of the electrical connector between the bus bar end and the collector bar end that is greater than 90 degrees.

7. The flexible electrical connector assembly of claim 1 further comprising a connector block adapted for joining the electrical connector to the bus bar.

8. The flexible electrical connector assembly of claim 7 further comprising a mating component adapted for joining the electrical connector to the collector bar.

9. The flexible electrical connector assembly of claim 1 wherein the plurality of conductive metal sheets define a slit along a current-carrying direction and perpendicular to a direction of sheet layering.

10. A flexible electrical connector assembly suitable for connecting a bus bar of an electrolytic cell to a collector bar of the electrolytic cell, the assembly comprising:
a flexible element;
a connector for connecting the flexible element to the bus bar, either directly; or through an intermediate element such that a connection between the flexible element and the bus bar is established;
wherein:
the collector bar includes a pair of edges that extend between the collector bar ends, the pair of edges of the collector bar defining limits of the collector bar;
the bus bar includes an inner bus bar surface, the inner bus bar surface defining a fundamental plane which includes the portion of the inner surface of the bus bar that faces the electrolytic cell;
and
while the flexible electrical connector assembly is viewed vertically from above, the connection between the flexible element and the bus bar, made via the connector, is substantially made at least 5 mm outside of both:
(i) the limits of the collector bar; and
(ii) an extension of the limits of the collector bare if the extension of the limits of the collector bar extend from the collector bar to the fundamental plane defined by the portion of the inner bus bar surface facing the electrolytic cell.

11. The flexible electrical connector assembly of claim 10, where the connector comprises of a fastener.

12. The flexible electrical connector assembly of claim 11, wherein the fastener comprises a bolt.

13. The flexible electrical connector assembly of claim 10, where the connector comprises of a weld.

14. The flexible electrical connector assembly of claim 10, where the connection between the flexible element and the bus bar is established substantially above a fundamental plane defining a bottom of the bus bar.

15. The flexible electrical connector assembly of claim 10, further including a non-bonded electrical contact to the bus bar and/or the collector bar, comprising:
a first mating component bonded to the flexible electrical connector, the first mating component adapted to connect the flexible component to the collector bar, or the bus bar, or both,
a second matching mating component mounted on, or incorporated into the bus bar or the collector bar; the matching mating components having two or more pairs of mating surfaces across which the two matching mating components are in electrical contact, where the pairs of mating surfaces are neither substantially parallel nor substantially coplanar; and
a securing device for securing the matching mating components against one another, such that a normal reaction force is generated on all pairs of mating surfaces.

16. The flexible electrical connector assembly of claim 15, where the normal reaction force is generated on the mating surfaces through the application of a force applied by a fastener or by frictional forces.

17. The flexible electrical connector of claim 10, where the flexible element consists of a plurality of conductive metal sheets, and wherein said sheets define a slit along a current-carrying direction and perpendicular to a direction of sheet layering.

18. A flexible electrical connector incorporating more than one flexible elements in at least two parallel electrical paths, where at least one of the paths include the flexible electrical connector of claim 1, and where each path: i) stems from the collector bar and joins to the bus bar; ii) has nominally equal electrical resistance; iii) is separated by at least 10 mm; and iv) does not overlap when looking in the direction of the axis of the collector bar.

* * * * *